Patented May 23, 1933

1,911,054

UNITED STATES PATENT OFFICE

GERALD R. BROPHY, OF SCHENECTADY, NEW YORK, ASSIGNOR TO GENERAL ELECTRIC COMPANY, A CORPORATION OF NEW YORK

ARC WELDING ELECTRODE

No Drawing.  Application filed April 30, 1930. Serial No. 448,792.

My invention relates to arc welding, and more particularly to an improved electrode for use in metallic arc welding.

During the formation of a weld by means of an electric arc the base metal and the metal of the electrode used in making the weld are rendered molten by the arc and unless this molten metal is suitably protected from the surrounding atmosphere, it will become contaminated and the resulting weld will be of poor quality.

In the presence of certain substances called fluxes the electric arc has been found to operate more satisfactorily and to deposit metal more uniformly than would be the case if these substances were not employed. These substances also have been used for their effect on the deposited metal, which may result from the formation during the welding operation of a protective atmosphere about the arc and molten portions of the weld as well as from the formation of a protective slag coating on the deposited weld metal.

According to my invention the wire or rod forming the core of my improved electrode is covered with a sleeve or envelope of flux material which, during the welding operation, slowly disintegrates, liberating a protective gaseous atmosphere about the arc and molten portions of the work and deposits on the weld metal a thin protective coating of slag material.

My invention will be better understood from the following description, and its scope will be pointed out in the appended claims.

The important ingredients of my electrode coating are non-fibrous comminuted cellulose material and slag-forming material. Both of these ingredients should be finely divided or in powdered form, and thoroughly mixed to produce a homogeneous mixture before being added to the electrode rod or wire as a covering or coating.

Many substances may be used for the non-fibrous cellulose material. I prefer to use finely ground bagasse flour which substance has an appreciable ammonia content. Bagasse flour is that residue left after the fibrous portion of sugar-cane as it comes crushed from the mill has been removed. This bagasse flour will usually contain a certain amount of fibrous material, but when properly ground this fibrous material will be destroyed and the resulting flour rendered non-fibrous. Under a microscope the resulting flour will appear as a fine powder. Any clay will be satisfactory for the slag-forming material of my electrode coating. Preferably I employ a finely divided clay such as is used for pottery and usually identified as china-clay, and use substantially the same quantity by weight as the cellulose material.

In order to hold these substances together and to the metal part of the electrode, I may employ a suitable binder such as sodium silicate. Preferably I employ sodium silicate containing $Na_2O$ to $SiO_2$ in about the ratio of 2:1, although other sodium silicates may be used. In fact, any water soluble silicate will be satisfactory.

I find it desirable to add to the coating material finely divided metallic powder having arc stabilizing characteristics and capable of exerting a strong reducing action on the deposited weld metal at fusion temperatures. The amount of such added metal may vary between 5 and 15% of the mixture. I prefer to employ powdered manganese which is used primarily as a deoxidizer and powdered titanium which also acts as a deoxidizer, but which is employed mainly for its arc-stabilizing characteristics. It is obvious that other metals than those specified having effects equivalent to manganese and/or titanium may be substituted therefor.

A preferred form of electrode according to my invention comprises a metallic rod having a coating of substantially the following composition, the relative proportions of the various ingredients being given by weight:

| | Per cent |
|---|---|
| Sodium silicate | 16 |
| Powdered bagasse flour | 38 |
| Fire-clay | 38 |
| Powdered manganese | 4 |
| Powdered titanium | 4 |

One method of manufacturing an electrode having the above composition is as follows:
About 1000 grams of clay are mixed with about 1000 grams of finely ground bagasse flour and 100 grams each of powdered manganese and powdered titanium. To this is added 1000 cc. of a sodium silicate solution composed of about 75% of water and 25% sodium silicate containing $Na_2O$ to $SiO_2$ in about the ratio of 2:1. The resulting solution contains about 16% sodium silicate and accounts for the 16% by weight of silicate in the resulting flux coating. The various materials above enumerated are thoroughly mixed and applied to the rod or wire forming the core of the electrode by means of dipping the rods or wires in the resulting mixture, or by applying the resulting mixture by extruding it through an opening or die, through which the rod or wire is drawn. After the coating has been thus applied the electrode is allowed to dry, and preferably thereafter baked in order to cause the covering or coating to solidify about the core rod or wire. Preferably the flux coating is applied as a heavy coating which should be about one-fifth the thickness of the core rod or wire.

By employing a non-fibrous comminuted cellulose material and a finely divided clay, a substantially homogeneous mixture may be produced which can be evenly applied about the metallic core of the electrode. It is important to have the coating material of a substantially homogeneous quality in order to have a smoothly operating welding arc. If a granular or fibrous cellulose material is employed the liberation of gases occasioned by the combustion of this material will be irregular, and this will in turn cause the welding arc to be erratic in its behaviour. The clay, employed in my flux as a slag-forming material, forms during the welding operation a thin coating upon the deposited weld material, thereby protecting it from the deleterious agents of the atmosphere, while at the same time regulating the rate of cooling of the deposited metal to facilitate the elimination of gases dissolved therein during the welding operation. Both the clay and the silicate binder function to retard the rate of combustion of the electrode covering so that, during the welding operation, a mechanical shield is formed for the arc at the end of the rod, from which the metal flows to the work. During the welding operation the bagasse flour which I employ burns forming about the arc a gaseous mixture containing hydrocarbons, carbon monoxide, carbon dioxide, and the dissociation products of ammonia, viz: hydrogen and nitrogen.

While I have described a particular embodiment of my invention, it will be obvious to those skilled in the art that various modifications may be made without departing therefrom, and I therefore desire in the appended claims to cover all such modifications as fall within the true spirit and scope of my invention.

What I claim as new and desire to secure by Letters Patent of the United States is:—

1. An arc welding electrode having a coating thereon containing cellulose having an appreciable ammonia content.

2. An arc welding electrode having a coating thereon of substantially equal parts by weight of non-fibrous comminuted cellulose material and finely divided slag-forming material.

3. An arc welding electrode having a coating thereon containing substantially equal parts by weight of powdered bagasse flour and clay with which is mixed a binding material.

4. An arc welding electrode comprising a metallic rod provided with a substantially homogeneous adherent coating containing approximately two parts by weight of non-fibrous cellulose material and two parts by weight of finely divided slag-forming material to one part by weight of water soluble silicate.

5. An arc welding electrode comprising a metallic rod having a substantially homogenous adherent coating thereon containing approximately the following proportions by weight: 16% sodium silicate; 38% bagasse flour; 38% fire-clay; 4% manganese, and 4% titanium.

6. An arc welding electrode having a coating thereon containing bagasse flour.

In witness whereof, I have hereunto set my hand this 29th day of April, 1930.

GERALD R. BROPHY.